United States Patent
Vroom et al.

(10) Patent No.: US 10,209,740 B2
(45) Date of Patent: Feb. 19, 2019

(54) EJECTION MECHANISM FOR DOCKED ELECTRONIC DEVICE

(71) Applicant: Henge Docks LLC, Arlington, VA (US)

(72) Inventors: Matthew Leigh Vroom, San Francisco, CA (US); Brandon Parod, Alameda, CA (US); Lyle Livingston-Guanzon, San Francisco, CA (US); Laura Mei, Hayward, CA (US)

(73) Assignee: Henge Docks LLC, Arlington, VA (US)

( * ) Notice: Subject to any disclaimer, the term of this patent is extended or adjusted under 35 U.S.C. 154(b) by 0 days.

(21) Appl. No.: 15/420,728

(22) Filed: Jan. 31, 2017

(65) Prior Publication Data

US 2018/0217635 A1    Aug. 2, 2018

(51) Int. Cl.
*G06F 1/16*    (2006.01)
(52) U.S. Cl.
CPC .................. *G06F 1/1632* (2013.01)
(58) Field of Classification Search
CPC ..................................................... G06F 1/1632
See application file for complete search history.

(56) References Cited

U.S. PATENT DOCUMENTS

| | | | | |
|---|---|---|---|---|
| 6,015,308 A * | 1/2000 | Lee | ...................... | G06F 1/1632 361/679.41 |
| 8,582,289 B2 * | 11/2013 | Zhou | ...................... | F16M 13/00 361/679.41 |
| 9,261,911 B2 * | 2/2016 | Lin | ...................... | G06F 1/1626 |
| 9,836,086 B2 * | 12/2017 | Suckle | ................... | G06F 1/1632 |
| 2012/0293949 A1 * | 11/2012 | Zhou | ...................... | H01R 27/00 361/679.41 |
| 2013/0050934 A1 * | 2/2013 | Zhou | ...................... | G06F 1/1632 361/679.43 |
| 2013/0163186 A1 * | 6/2013 | Mizusawa | ................ | H05K 7/14 361/679.41 |
| 2014/0118923 A1 * | 5/2014 | Stanley | ................. | G06F 1/1626 361/679.41 |
| 2014/0268542 A1 * | 9/2014 | Moon | ................... | G06F 1/1632 361/679.41 |
| 2015/0036283 A1 * | 2/2015 | Suckle | ................... | G06F 1/1632 361/679.43 |

(Continued)

*Primary Examiner* — Hoa C Nguyen
*Assistant Examiner* — Keith DePew
(74) *Attorney, Agent, or Firm* — Benjamin E. Maskell (57) ABSTRACT

Disclosed is a docking station for holding an electronic device including a main body, a vertical support, a horizontal support, a cut-out in the horizontal support, and an ejection mechanism. The ejection mechanism includes a base member, a top member, an extension member disposed on the top member, an electrical connector disposed on the extension member, and a first and second bars hingedly connecting the base member to the top member. The top member is configured to be disposed in a first position in which the electrical connector is disposed at a first height with respect to the horizontal support and substantially parallel to the vertical support. The top member is further configured to be disposed in a second position in which the electrical connector is disposed at a second height with respect to the horizontal member and substantially non-parallel with the vertical support. The second height is less than the first height.

20 Claims, 6 Drawing Sheets

(56) References Cited

U.S. PATENT DOCUMENTS

| | | | |
|---|---|---|---|
| 2015/0185773 A1* | 7/2015 | Vroom | G06F 1/1632 361/679.41 |
| 2015/0248141 A1* | 9/2015 | Singleton | G06F 1/1632 361/679.41 |
| 2015/0362953 A1* | 12/2015 | Shindo | H02J 7/0044 361/679.41 |
| 2016/0195898 A1* | 7/2016 | Lau | H04M 1/04 361/679.41 |

* cited by examiner

EJECTION MECHANISM FOR DOCKED ELECTRONIC DEVICE

BACKGROUND OF THE INVENTION

Field of the Invention

The embodiments of the invention relate to a docking station for an electronic device, and more particularly, to an ejection mechanism for a docking station for phones and tablets. Although embodiments of the invention are suitable for a wide scope of applications, it is particularly suitable for ejecting a cellular telephone from a docking station while minimizing potential damage.

Discussion of the Related Art

The related art includes, for example, U.S. Pat. No. 9,170,610 to Vroom et. al. ("Vroom"). Vroom attempts to solve a problem of undocking an electronic device with one hand. In the related art, undocking normally requires two hands. A user would first place a hand on the docking station and then remove the electronic device with the other hand. Two hands are generally required because the force required to extract the device can be more than the weight of most devices. To solve this problem, Vroom discloses a docking station that is both small and heavy. Vroom discloses that a small docking station can achieve a form factor that is aesthetically pleasing and takes up little space. At the same time, because the docking station is heavy, a user can remove the electronic device from the docking station without having to separately hold the docking station.

The related art, however, has some short comings. First, the connector portion of related art is static. Thus to remove a device from the docking station, a user must carefully pull the electronic device along the axis of the connector. If the user pulls slightly off axis, the connector could bind in the electronic device, break, cause damage to the electronic device, or otherwise cause extra wear-and-tear. Second, the related art teaches that heavy docking stations are a solution to overcoming the two-hand problem. Heavy docking stations, however, require more material and cost more to transport. Third, as connectors evolve, extraction forces may increase to a point where a heavy docking station is simply not feasible.

SUMMARY OF THE INVENTION

Accordingly, embodiments of the invention are directed to a [title of invention] that substantially obviates one or more of the problems due to limitations and disadvantages of the related art.

An object of embodiments of the invention is to provide a docking station for an electronic device that facilitates removal of the device at a variety of angles.

Another object of embodiments of the invention is to provide a docking station that does not rely on weight alone to overcome the extraction force needed to remove the connector from the electronic device.

Yet another object of embodiments of the invention is to provide a docking station for an electronic device that minimizes wear-and-tear on the connector portion of the electronic device and prevents accidental damage.

Still another object of embodiments of the invention is to provide a docking station for an electronic device that efficiently uses materials and is not unduly heavy.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an ejection mechanism for a docked electronic device can be embodied in a docking station. The docking station can include a main body, a vertical support, a horizontal support, a cut-out in the horizontal support, and an ejection mechanism. The ejection mechanism includes a base member, a top member, an extension member disposed on the top member, an electrical connector disposed on the extension member, and a first and second bars hingedly connecting the base member to the top member. The top member is configured to be disposed in a first position in which the electrical connector is disposed at a first height with respect to the horizontal support and substantially parallel to the vertical support. The top member is further configured to be disposed in a second position in which the electrical connector is disposed at a second height with respect to the horizontal member and substantially non-parallel with the vertical support. The second height is less than the first height.

In another aspect, an ejection mechanism for a docked electronic device includes a base member, a top member, an extension member disposed on the top member, an electrical connector disposed on the extension member, a first bar hingedly connecting the base member to the top member, a second bar hingedly connecting the base member to the top member, a third bar hingedly connecting the base member to the top member, a fourth bar hingedly connecting the base member to the top member, a first four-bar linkage formed from the top member, the bottom, member, the first bar and the second bar, and a second four-bar linkage formed from the top member, the bottom, member, the third bar and the fourth bar.

In yet another aspect, an ejection mechanism for a docked electronic device is embodied in a docking station. The docking station can include a back support, a bottom support, a electrical connector, and an ejection mechanism. The ejection mechanism can include a top, a base, a first bar hingedly connecting the base to the top, a second bar hingedly connecting the base to the top, an extension member between the top of the ejection mechanism and the electrical connector. The ejection mechanism can be disposed in a first position in which the electrical connector is substantially parallel with the back support. The ejection mechanism can alternatively be disposed in a second position in which the electrical connector is substantially non-parallel with the back support.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1A:
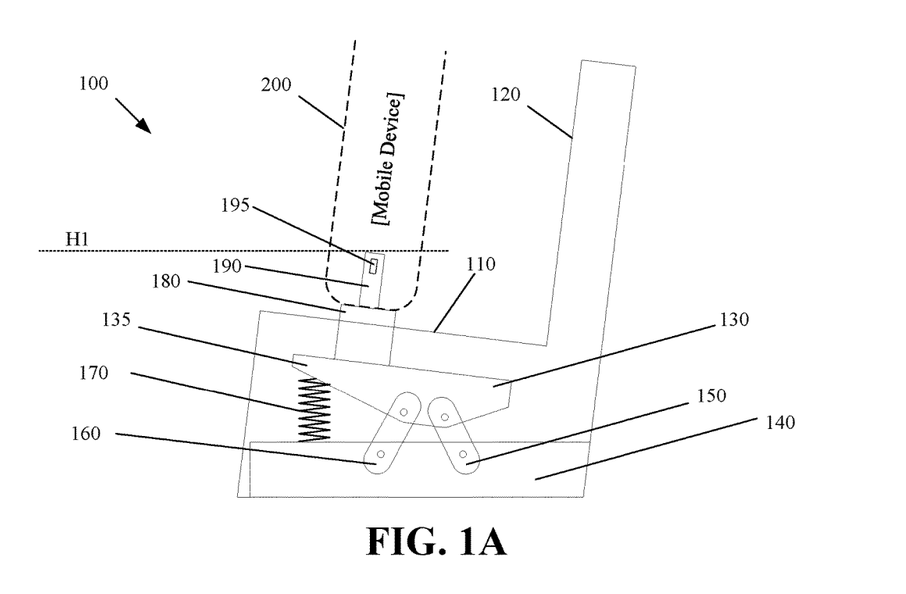
FIG. 1A is side view of a docking station according to an exemplary embodiment of the invention.
Figure 1B:
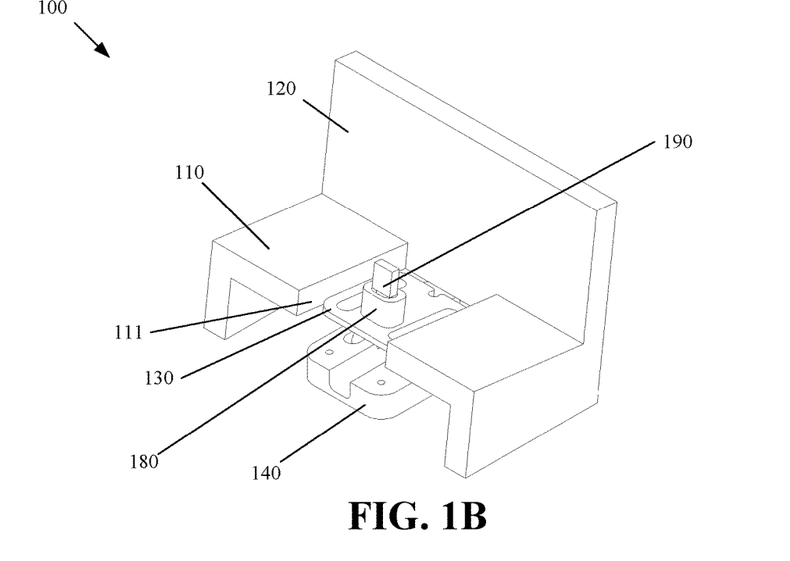
FIG. 1B is an isometric view of the docking station of FIG. 1A.

FIG. 1A is side view of a docking station according to an exemplary embodiment of the invention and FIG. 1B is an isometric view of the docking station of FIG. 1A. As shown in FIG. 1A and FIG. 1B, a docking station 100 for an electronic device 200 can include a horizontal support 110, a vertical support 120, a base 140, a top 130, an extender 180, and an electrical connector 190. The base 140 can be connected to the top 130 by bars 150 and 160. The horizontal support 110 can include a cut-out 111. The electrical connector 190 can have a detent 195. The top 130 can have a front side 135. Collectively, the top 130, the base 140, and the bars 150 and 160 can be referred to as the ejection mechanism.

The horizontal support 110 and the vertical support 120 can be slightly tilted. In preferred embodiments of the invention the each of the horizontal support 110 and the vertical support 120 are tilted approximately seven degrees. An electronic device 200 can be placed on top of the electrical connector 190 such that the connector is pushed into a mating connector (not shown) on the electronic device 200. In FIG. 1A, the horizontal support 110 and the vertical support 120 are illustrated as not touching the electronic device 200 for clarity of illustration. However, in preferred embodiments of the invention the horizontal support 110 and the vertical support 120 are sized in appropriate dimensions to contact the electronic device 200. In the alternative, spacers can be added to the horizontal support 110 and the vertical support 120 as will be described in conjunction with FIG. 4A and FIG. 4B. In another alternative, the ejection mechanism can be movably mounted within the docking station 100 so that the connector 190 can be advantageously positioned within the cut-out 111 so that the horizontal support 110 and the vertical support 120 contact and support the electronic device 200.

The electronic connector 190 can have a detent 195. The detent 195 can receive a retention member (not shown) disposed in a mating receptacle (not shown) of the electronic device 200. The cooperation of the detent and the retention member can securely hold the electrical connector 190 in the electronic device 200. An extraction force can defined as the force required to remove the connector 190 from the electronic device 200. The extraction force can be due, in part, to the detent 195 and retention member (not shown). The extraction force can be due, in part, to friction caused by the electrical and mechanical components of the electronic device 200 on the connector 190. The extraction force for a single electric connector is commonly two or three pounds, however, a variety of environmental factors and design considerations can affect the extraction force.

The electric connector 190 can be disposed on an extension 180 on the top 130. The extension 180 can provide additional length to the connector 190 so that the connector 190 has sufficient length to penetrate a case (see, e.g. FIG. 4A) that may be covering the mobile device. The extension 180 can be sized in relative proportions to match an insulating portion of a standard connector for the electronic device. After market cases will commonly have cutouts around ports of the electronic device to allow for standard-sized connectors to interface with the electronic device without removing the case. Thus, in preferred embodiments of the invention, the extension 180 has width and depth approximately equal to that of the standard connector for the electronic device 200. For example, in embodiments where the electronic device is an iPhone, the extension 180 can have the same width and depth as a standard Apple Lighting connector. In another example, in embodiments of the invention where the electronic device is a Samsung phone, the extension 180 can have the same width and depth as the connector supplied with device. In this way, the docking station 100 can be compatible with a variety of cases for an electronic device so long as the case has cutouts surrounding the ports of the electronic device that are sized to receive standard connectors.

The embodiment illustrated in FIG. 1A and FIG. 1B can be advantageous for holding an electronic device and can be described as the "docked" position. In the docked position, the electronic connector 190 is at its highest point H1. In the docked position, the extension 180 may project slightly above the horizontal member 110. Spacers (not shown) can be added to the horizontal member 110 and the vertical member 120 to provide support to the electronic device 200.

The top 130 can be hingedly mounted to the base 140 via bars 150 and 160. A spring 170 can maintain the docking station in the docked position. Although the spring is illustrated as disposed between the top 130 and the bottom 140, the embodiment of FIG. 1A is not intended to be limiting and other arrangements of springs that achieve the objectives of the invention are contemplated and within the scope of the invention. For example, the embodiment of FIG. 1A shows a spring 170 that will be compressed between the top 130 and the bottom 140 near the front 135. Those of skill in the art will appreciate, however, that the spring could alternatively be disposed on the opposite side (e.g. the back, opposite 135) and be stretched rather than compressed. As another alternative, the spring could be attached to the top 130 and another structure of the docking station 100.

When a user removes the electronic device 200 from the docking station 100, a user is naturally inclined to pull straight up, or towards themselves (i.e. towards the left side of FIG. 1A). In the related art of Vroom, the connector was static and a user's natural removal motion could cause binding and damage because users do not readily appreciate that the electronic device should be removed at an angle slightly off of vertical. The embodiments of the present invention solve this "off-axis removal problem" by providing a connector 190 that will hingedly rotate towards a user when a user attempts to remove the electronic device 200 at an angle that is non-parallel with the axis of the connector 190.

The top 130, bottom 140, and bars 150 and 160 can form a four-bar linkage. The extension 180 and the connector 190 can be placed near a front 135 of the top 130. The extension 180 and the connector 190 can be placed closer to the front 135 than the connection points (FIG. 5, 136) of the bars 150 and 160 with the top 130. When a user pulls the electronic device forward during an off-axis undocking, the four bar linkage can cause the top 130 to tilt and rotate downwards towards the base 140. At the same time, the extension 180 and the connector 190 similarly tilt and rotate downwards. In this way, the ejection mechanism provides two improvements over the related art of Vroom. First, the present invention allows the connector 190 to rotate thereby limiting the potential for damage caused by an off-axis removal. Second, off-axis removal can cause the four bar linkage to rotate the top 130 down and away from the electronic device 200 thereby causing the connector 190 to be lowered (see e.g. FIG. 3A, H2). The lowering of the connector 190 can cause the connector 190 to be slightly removed from the electronic device 200 and can assist in overcoming the extraction force.

It should be noted that the figures of the instant application do not explicitly show a connection between the four bar linkage and body of the docking station (e.g. horizontal support 110 and vertical support 120.) In preferred embodiments of the invention, these components are connected by structures that would be known to one of skill in the art, for example, by mounting the components on the same base, by using glue or screws, or by adding additional structural members to connect them. The specific connecting structure is not critical to the invention and illustration of these connecting components has been omitted for clarity.

Figure 2A:
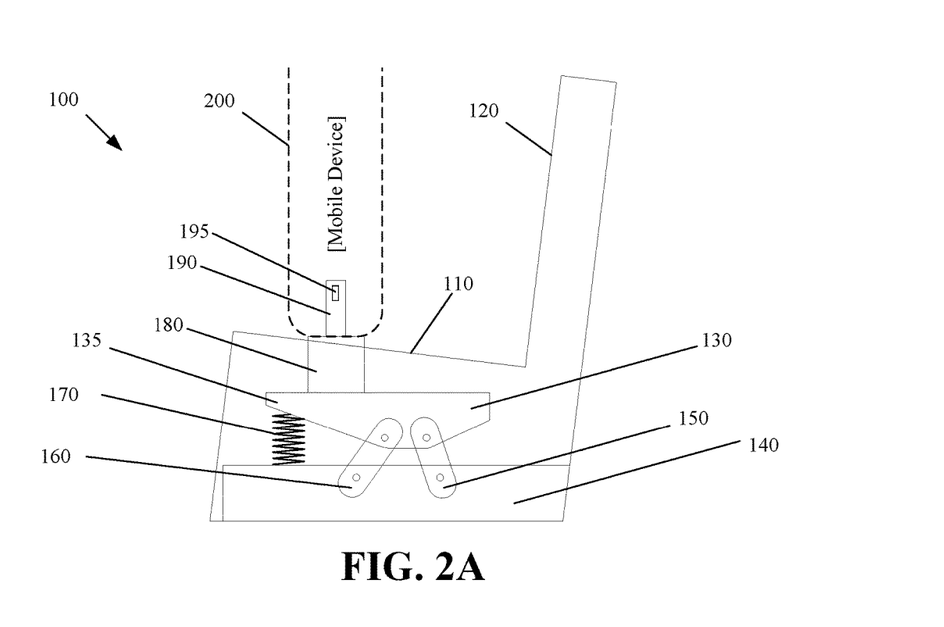
FIG. 2A is side view of a docking station according to an exemplary embodiment of the invention.
Figure 2B:
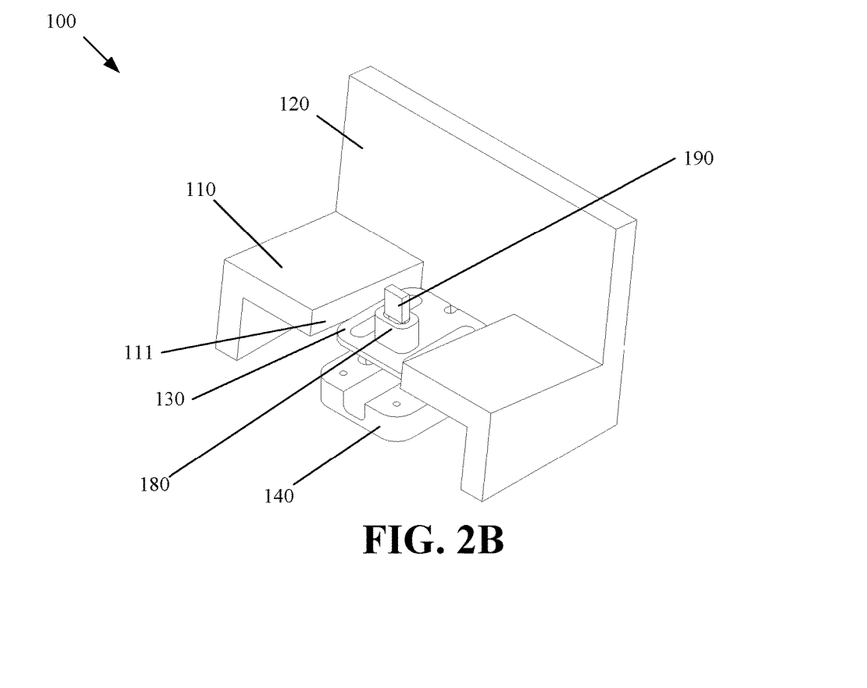
FIG. 2B is an isometric view of the docking station of FIG. 2A.

FIG. 2A is side view of a docking station according to an exemplary embodiment of the invention and FIG. 2B is an isometric view of the docking station of FIG. 2A. FIG. 2A and FIG. 2B can be associated with an intermediate position during an off-axis removal of an electronic device. As shown in FIG. 2A and FIG. 2B, a docking station 100 for an electronic device 200 can include a horizontal support 110, a vertical support 120, a base 140, a top 130, an extender 180, and an electrical connector 190. The base 140 can be connected to the top 130 by bars 150 and 160. The horizontal support 110 can include a cut-out 111. The electrical connector 190 can have a detent 195. The top 130 can have a front side 135. Collectively, the top 130, the base 140, and the bars 150 and 160 can be referred to as the ejection mechanism.

In the embodiment of FIG. 2A and FIG. 2B the electronic device 200 is illustrated in a more upright and vertical position than as shown in FIG. 1A and FIG. 1B and shows the movement of the four bar linkage formed by the top 130, base 140, and first and second bars 150,160 relative to FIG. 1A and FIG. 1B. This more upright position can be an intermediate position between the docked position and a fully rotated position. In FIG. 2A and FIG. 2B, the top 130 is now parallel with the base 140 whereas in FIG. 1A and FIG. 1B the top 130 was parallel with the horizontal support 110. In FIG. 2A and FIG. 2B, the electronic device 200 is disposed at an angle to the vertical support 120 whereas in FIG. 1A and FIG. 1B the electronic device 200 was parallel with the vertical support 110. The extension 180 and the connector 190 are now lower in FIGS. 2A and 2B than in FIG. 1A and FIG. 1B. The electronic device 200 is nearly touching the horizontal support. If the electronic device were to be rotated any further, the electronic device would touch the horizontal support. Thereafter, further rotation of the electronic device would also continue to cause the extension 180 and connector 190 to continue to be lowered and begin removal of the same from the electronic device 200.

Figure 3A:
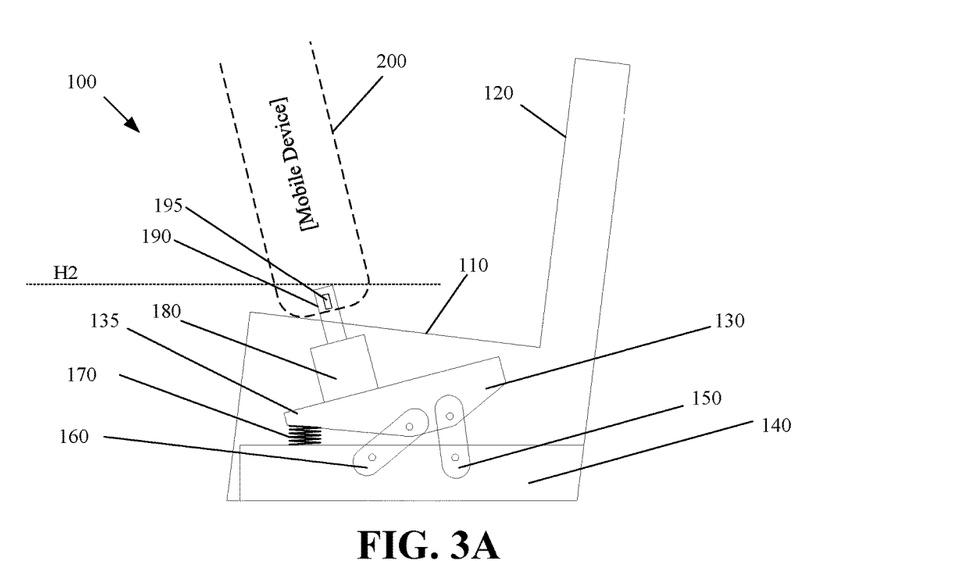
FIG. 3A is side view of a docking station according to an exemplary embodiment of the invention.
Figure 3B:
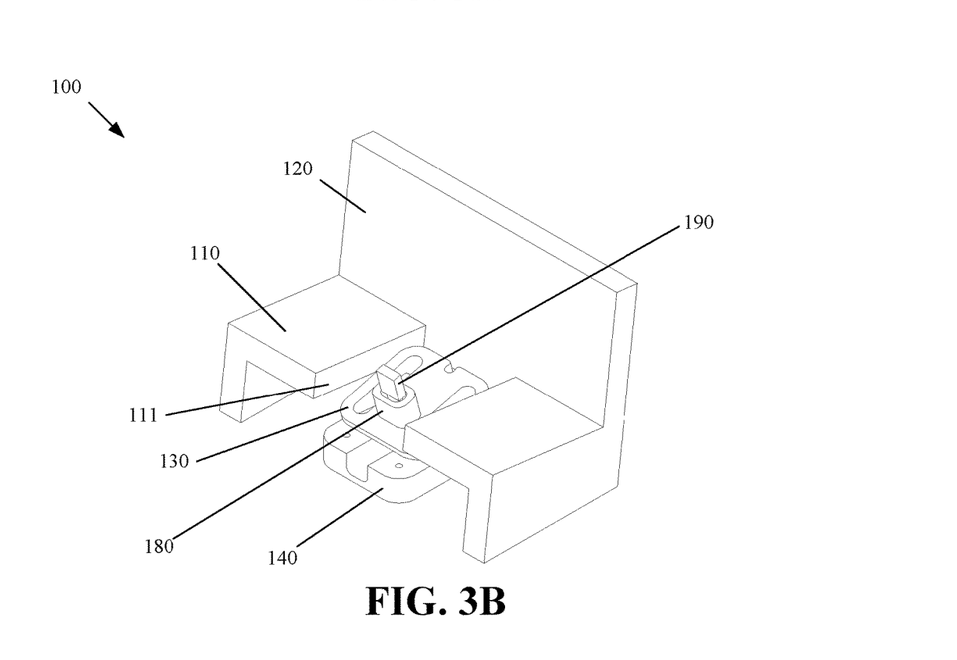
FIG. 3B is an isometric view of the docking station of FIG. 3A.

FIG. 3A is side view of a docking station according to an exemplary embodiment of the invention and FIG. 3B is an isometric view of the docking station of FIG. 3A. FIG. 3A and FIG. 3B can be associated with a fully-rotated position during an off-axis removal of an electronic device. As shown in FIG. 3A and FIG. 3B, a docking station 100 for an electronic device 200 can include a horizontal support 110, a vertical support 120, a base 140, a top 130, an extender 180, and an electrical connector 190. The base 140 can be connected to the top 130 by bars 150 and 160. The horizontal support 110 can include a cut-out 111. The electrical connector 190 can have a detent 195. The top 130 can have a front side 135. Collectively, the top 130, the base 140, and the bars 150 and 160 can be referred to as the ejection mechanism or the four bar linkage.

In the embodiment of FIG. 3A and FIG. 3B the electronic device 200 is illustrated in a tilted-forward as opposed to slightly tilted back as shown in FIG. 1A and FIG. 1B and shows the movement of the four bar linkage formed by the top 130, base 140, and first and second bars 150,160 relative to FIG. 1A and FIG. 1B. This tilted-forward or fully rotated position can be a position where the top 130 is rotated to its maximum position. In FIG. 3A and FIG. 3B, the top 130 is now tilted down and to the left with respect to the base 140 whereas in FIG. 1A and FIG. 1B the top 130 was parallel with the horizontal support 110. In FIG. 3A and FIG. 3B, the electronic device 200 is disposed at an angle to the vertical support 120 whereas in FIG. 1A and FIG. 1B the electronic device 200 was parallel with the vertical support 110. The extension 180 and the connector 190 are now at height H2 which is lower than height H1 shown in FIG. 1A. In FIG. 3A, the electronic device 200 is touching the horizontal support and the connector 190 is partially removed from the electronic device 200.

Figure 4A:
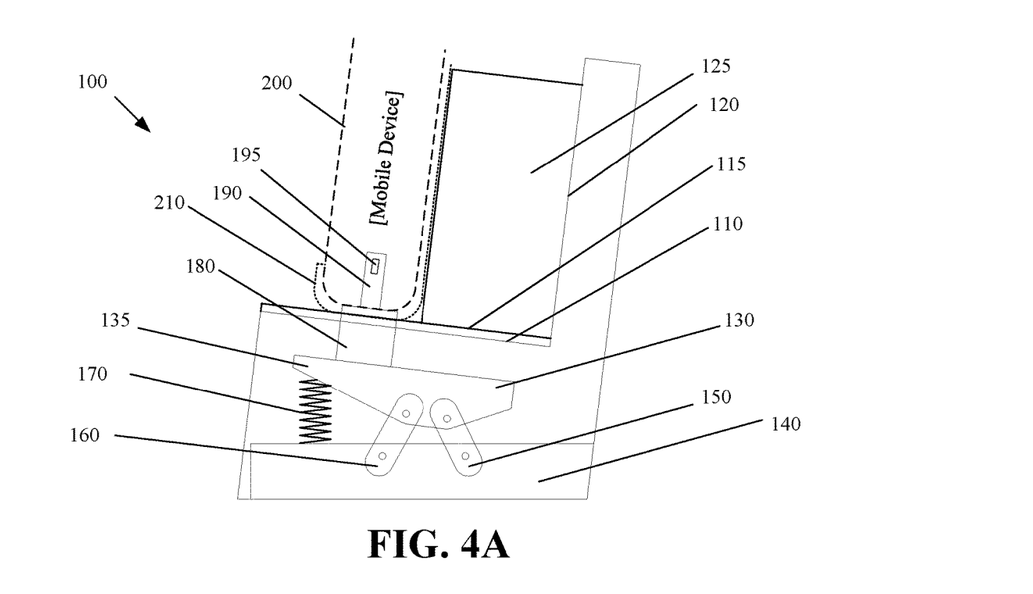
FIG. 4A is side view of a docking station according to an exemplary embodiment of the invention.
Figure 4B:
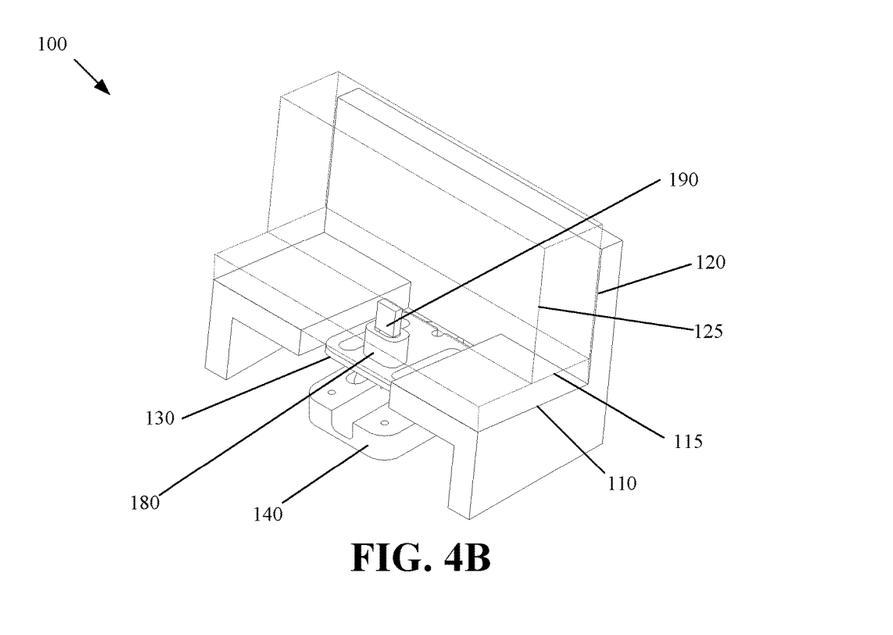
FIG. 4B is an isometric view of the docking station of FIG. 4A.

FIG. 4A is side view of a docking station according to an exemplary embodiment of the invention and FIG. 4B is an isometric view of the docking station of FIG. 4A. The embodiment of FIG. 4A and FIG. 4B are similar to FIG. 1A and FIG. 1B (respectively) and discussion of duplicate parts will be omitted. As shown in FIGS. 4A and 4B, a docking station 100 for an electronic device 200 can further include a horizontal spacer 115 and a vertical spacer 125. The electronic device 200 can further include a case 210.

The case 210 can be any case compatible with the electronic device 200. The case 210 and the electronic device 200 are illustrated for context only and are not intended to limit the scope or applicability of the invention.

Because of the wide variety of shapes, sizes, and thicknesses for the cases 210, the horizontal support 110 and the vertical support 120 can be spaced apart from the anticipated location of the electronic device 200 and case 210. A user can select a horizontal spacer 115 and a vertical spacer 125 of an appropriate size to support the electronic device 200 and case 210 from the bottom side (near horizontal support 110) and rear (near vertical support 120).

Figure 5:
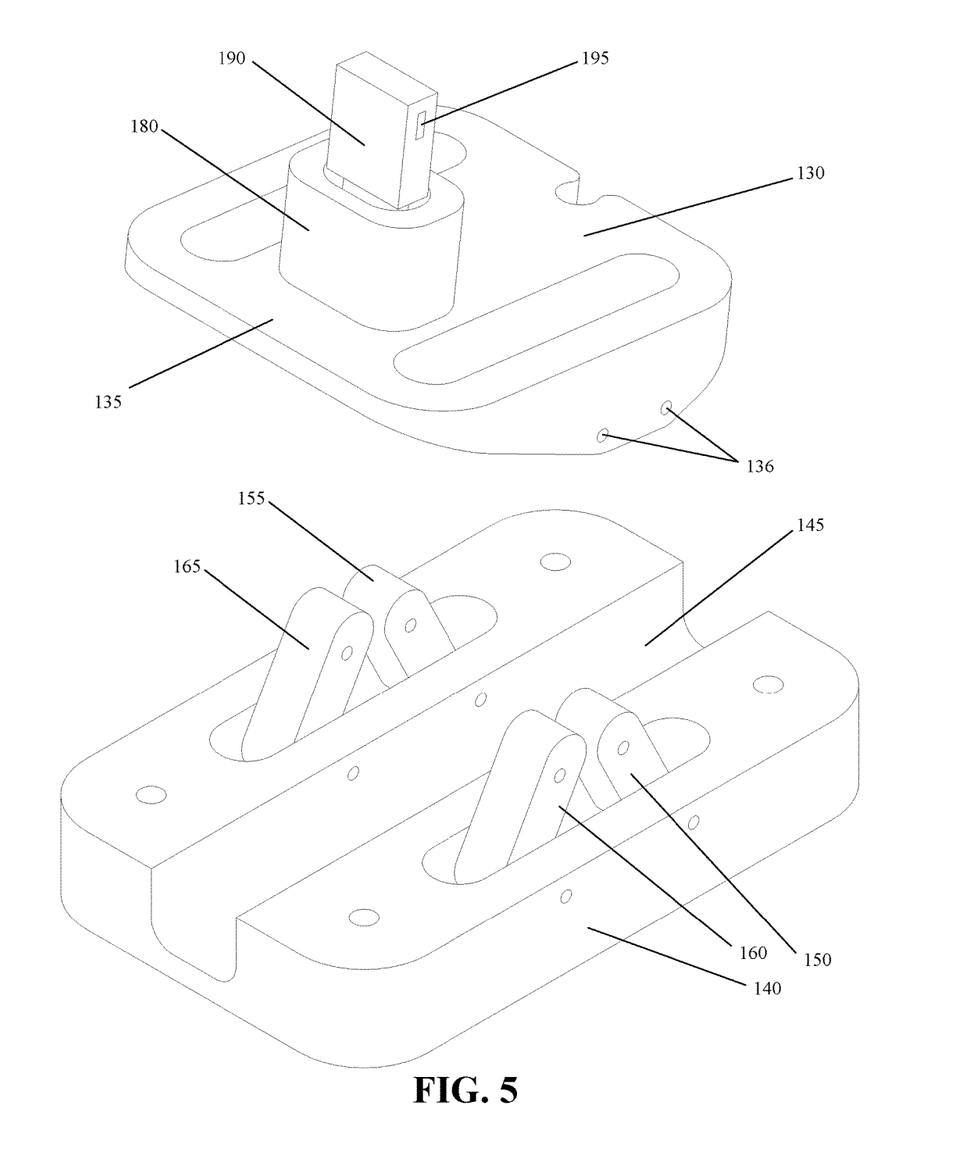
FIG. 5 is an exploded isometric view of an ejection mechanism according to an exemplary embodiment of the invention.

FIG. 5 is an exploded isometric view of an ejection mechanism according to an exemplary embodiment of the invention. As shown in FIG. 5, an ejection mechanism can include a base 140, a top 130, an extender 180, and an electrical connector 190. The base 140 can be connected to the top 130 by bars 150, 155, 160, and 165. The electrical connector 190 can have a detent 195. The top 130 can have a front side 135. Collectively, the top 130, the base 140, and the bars 150, 155, 160, and 165 can be referred to as the ejection mechanism. The base 140 can have a channel 145. The top 130 can have a plurality of connection points 136.

The extender 180 and the connector 190 can be closer to the front 135 of the top 130 than the connection points 136. The connection points 136 correspond to bars 150,160. Although only two connection points 136 on the top 130 are shown, it should be appreciated that symmetrical connection points (not shown) are disposed on the top 135 to correspond to bars 155, 165. The ejection mechanism can be low profile in that the top 130 and base 140 are close together. The channel 145 can allow a wire or cable to pass out of the connector 190, through the extension 180 and then through the channel 145 in the base 140 (see FIG. 6, 185). In the embodiment of FIG. 5, the channel 145 extends lengthwise from one end of the base 140 to the other. The base 140 can be symmetrical so that it can be installed in multiple orientations. The channel 145, however, need not extend out the front of the base 140 and, in other embodiments, the channel 145 begins approximately below the extension 180 and extends through the back side (FIG. 5, right side) of the base 140.

The bars 160 and 165 can be longer than the bars 150 and 155, respectively. When a rotation force is applied to the connector 190, the variation in bar length can cause the front side 135 of the top 130 to lower with respect to the rest of the top 130 thereby retracting the connector 190 into and below the horizontal support (not shown).

Figure 6:
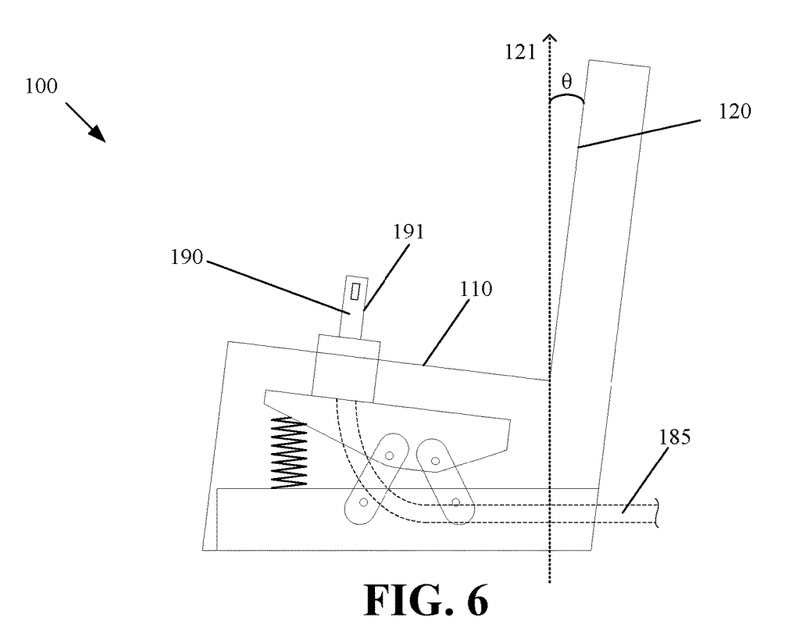
FIG. 6 is side view of a docking station according to an exemplary embodiment of the invention.

FIG. 6 is side view of a docking station according to an exemplary embodiment of the invention. The embodiment of FIG. 6 is similar to FIG. 1A and discussion of duplicate parts will be omitted. As shown in FIG. 6, a docking station 100 can have a vertical axis 121 and a vertical support 120 can be rotationally offset with respect to the vertical axis 121 by an angle θ (theta). In preferred embodiments of the invention theta is between three degrees and fifteen degrees or approximately 7. A wire 185 can be connected to the electrical connector 190. The electrical connector 190 can have a rear side 191 that is approximately parallel to the vertical support 120 when in the docked position.

It will be apparent to those skilled in the art that various modifications and variations can be made in the ejection mechanism for a docked electronic device without departing from the spirit or scope of the invention. Thus, it is intended that embodiments of the invention cover the modifications and variations of this invention provided they come within the scope of the appended claims and their equivalents.

What is claimed is:

1. A docking station for holding an electronic device, the docking station comprising:
   a main body;
   a vertical support of the main body;
   a horizontal support of the main body;
   a cut-out in the horizontal support;
   an ejection mechanism; the ejection mechanism including:
   a base member;
   a top member defining a platform;
   an extension member disposed on the top member, the extension member extending perpendicularly from the platform of the top member;
   an electrical connector disposed on the extension member, the electrical connector smaller than the extension member;
   a first bar hingedly connecting the base member to the top member;
   a second bar hingedly connecting the base member to the top member;
   wherein the top member is configured to be disposed in a first position in which the electrical connector is disposed at a first height with respect to the horizontal support and substantially parallel to the vertical support;
   wherein the top member is configured to be alternatively disposed in a second position in which the electrical connector is disposed at a second height with respect to the horizontal support and substantially non-parallel with the vertical support; and
   wherein the second height is less than the first height.

2. The docking station of claim 1 wherein a face of the vertical support is tilted approximately seven degrees.

3. The docking station of claim 1 further comprising a spring configured to maintain the top member in the first position.

4. The docking station of claim 1 wherein the first bar is longer than the second bar.

5. The stand for a mobile device of claim 1 further comprising
   a channel in the base member for receiving a cable associated with the electrical connector.

6. An ejection mechanism for an electronic device, the ejection mechanism comprising:
   a base member;
   a top member defining a platform;
   an extension member disposed on the top member, the extension member extending perpendicularly from the platform of the top member;
   an electrical connector disposed on the extension member, the electrical connector smaller than the extension member;
   a first bar hingedly connecting the base member to the top member;
   a second bar hingedly connecting the base member to the top member;
   a third bar hingedly connecting the base member to the top member;
   a fourth bar hingedly connecting the base member to the top member;
   a first four-bar linkage formed from the top member, the base member, the first bar and the second bar; and
   a second four-bar linkage formed from the top member, the base member, the third bar and the fourth bar.

7. The ejection mechanism of claim 6 further comprising:
   a front side of the top member;
   a plurality of connection points of the top member, each of the plurality of connection points associated with one of the first, second, third, and fourth bars;
   wherein the extension member is disposed closer to the front side of the top member than each of the plurality of connection points.

8. The ejection mechanism of claim 6 further comprising:
   a channel in the base member for receiving a cable associated with the electrical connector.

9. The ejection mechanism of claim 6 wherein the first bar is longer than the second bar and the third bar is longer than the fourth bar.

10. The ejection mechanism of claim 6
wherein the top member can be disposed in a first position in which the electrical connector is disposed at a maximum distance from the base member;
wherein the top member can alternatively be disposed in a second position in which the electrical connector is disposed at a minimum distance from the base member;
wherein the top member can be hingedly rotated between the first position and the second position;
wherein electrical connector is disposed at a first angle with respect to the base member in the first position; and
wherein the electrical connector is disposed at a second angle with respect to the base member in the second position.

11. The ejection mechanism of claim 10 further comprising:
a spring configured to maintain the top member in the first position.

12. A stand for a mobile device, the stand comprising:
a back support;
a bottom support;
a electrical connector;
an ejection mechanism, the ejection mechanism including:
a top defining a platform;
a base;
a first bar hingedly connecting the base to the top;
a second bar hingedly connecting the base to the top;
an extension member between the top of the ejection mechanism and the electrical connector, wherein the extension member extends perpendicularly from the platform of the top and wherein the extension member is larger than the electrical connector;
wherein the ejection mechanism can be disposed in a first position in which the electrical connector is substantially parallel with the back support; and
wherein the ejection mechanism can alternatively be disposed in a second position in which the electrical connector is substantially non-parallel with the back support.

13. The stand for a mobile device of claim 12
wherein the electrical connector is disposed at a first height when the ejection mechanism is disposed in the first position;
wherein the electrical connector is disposed at a second height when the ejection mechanism is disposed in the second position; and
wherein the first height is higher than the second height.

14. The stand for a mobile device of claim 12 wherein the first bar is longer than the second bar.

15. The stand for a mobile device of claim 12 further comprising:
a spring configured to maintain the top member in the first position.

16. The stand for a mobile device of claim 12 wherein the vertical support is tilted approximately seven degrees.

17. The stand for a mobile device of claim 12 further comprising
a channel in the base member for receiving a cable associated with the electrical connector.

18. The stand for a mobile device of claim 12 further comprising:
a third bar hingedly connecting the base to the top; and
a fourth bar hingedly connecting the base to the top.

19. The stand for a mobile device of claim 18 wherein the first bar is longer than the second bar and the third bar is longer than the fourth bar.

20. The stand for a mobile device of claim 12 further comprising:
a front side of the top of the ejection mechanism;
a plurality of connection points of the top of the ejection mechanism, each of the plurality of connection points associated with one of the first and second bars;
wherein the extension member is disposed closer to the front side than each of the plurality of connection points.

* * * * *